Figure 1:
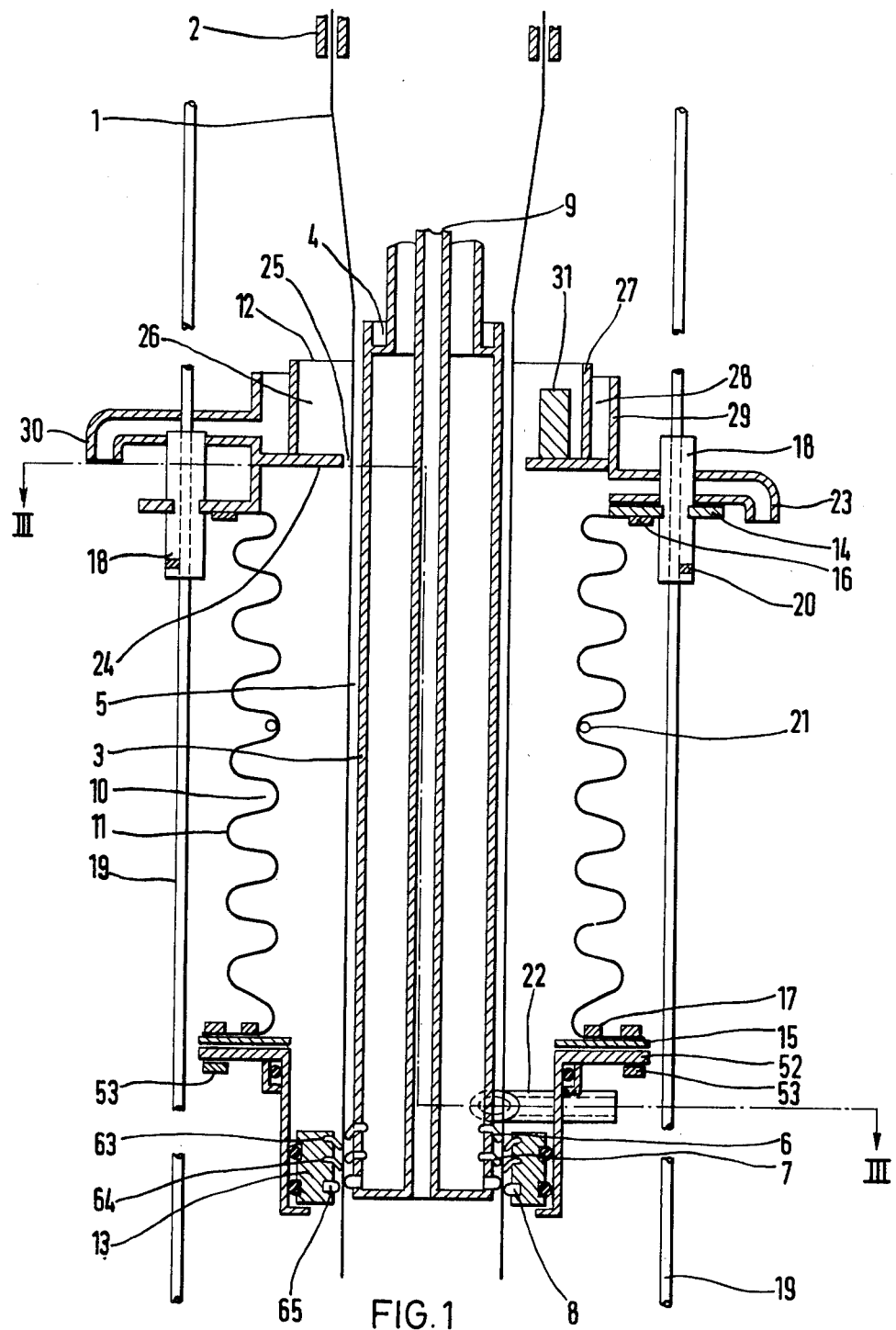

United States Patent [19]

Clifford

[11] 4,130,616
[45] Dec. 19, 1978

[54] TUBULAR EXTRUDATE

[75] Inventor: Michael L. Clifford, St-Martens-Latem, Belgium

[73] Assignee: Imperial Chemical Industries Limited, London, England

[21] Appl. No.: 804,375

[22] Filed: Jun. 7, 1977

[30] Foreign Application Priority Data

Mar. 21, 1977 [GB] United Kingdom ............... 11808/77

[51] Int. Cl.² ...................... B29C 17/00; B29D 23/04
[52] U.S. Cl. .................................... 264/514; 264/519; 264/90; 264/558; 264/173; 264/178 R; 264/180; 264/210 R; 425/71
[58] Field of Search ............. 264/95, 89, 178 R ≧ 180, 264/173, 210 R, 290 R; 425/71

[56] References Cited

U.S. PATENT DOCUMENTS

| 3,337,663 | 8/1967 | Taga | 264/95 |
| 3,344,474 | 10/1967 | Davis et al. | 425/71 |
| 3,402,428 | 9/1968 | Schreiber | 425/71 |
| 3,427,375 | 2/1969 | Turner | 264/95 |
| 3,622,657 | 11/1971 | North et al. | 264/95 |
| 3,717,425 | 2/1973 | North et al. | 264/180 |
| 3,819,776 | 6/1974 | Robinson et al. | 264/95 |
| 3,886,243 | 5/1975 | Uemura et al. | 264/95 |

Primary Examiner—Jeffery R. Thurlow
Attorney, Agent, or Firm—Cushman, Darby & Cushman

[57] ABSTRACT

Cooling a tubular extrudate for conversion to tubular film by passing the extrudate through a bath of cooling liquid so that the external surface of the extrudate contacts in sequence countercurrent streams of cooling liquid in a quiescent zone, a restricted throttle zone and a spiral flow zone.

9 Claims, 4 Drawing Figures

TUBULAR EXTRUDATE

This invention relates to the production of tubular forms, and, in particular, to a method of producing a cooled tubular form suitable for conversion to a tubular film.

Oriented tubular film is produced by extruding a relatively thick-walled thermoplastic tube from an annular orifice, and subsequently stretching the extruded tube, at a temperature below the melting temperature and above the glass transition temperature (Tg) of the thermoplastic material, in the transverse and/or longitudinal directions to form a thin film, the stretching being effected in the transverse direction by means of internal gas pressure, and in the longitudinal direction by withdrawing the tube at an appropriate rate in the direction of extrusion. In the case of an oriented film produced from a crystalline or crystallisable polymer, the polymeric extrudate must be rapidly cooled, prior to reheating and stretching, to induce an appropriate crystalline polymeric structure for the production of film of acceptable quality.

Cooling of the extruding tube is conveniently effected internally — for example, by means of a cooling and sizing mandrel located within the tube in the vicinity of the die from which the tube is extruded. If desired, additional external cooling may be effected by passing the tube through an annular cooling bath surrounding the tube in the region of the mandrel. By simultaneously cooling the exterior and interior surfaces of the extruding tube, increased rates of film production may be achieved.

In cooling tubular forms, especially polymeric tubular extrudates intended for the production of oriented tubular films, it is difficult to reconcile the conflicting requirements of a high flow of cooling liquid necessary to effect the desired reduction in temperature of the tubular form, and the need to ensure a smooth progression of the hot tubular form into and through the bath of cooling liquid - to avoid vibration of the form and the creation of ripples on the surface of the cooling liquid which may damage the surface of the form with consequent production of film exhibiting surface blemishes and other defects.

Various proposals have been made to overcome the aforementioned difficulties including the use of a cooling bath in which the tubular form first contacts a laminar cocurrent flow and then a turbulent countercurrent flow of cooling liquid.

We have now developed an improved method for cooling a tubular form.

Accordingly, the present invention provides a method of producing a polymeric tubular film comprising extruding a tube of a film-forming polymeric material, passing the extruded tube over and around an internal cooling mandrel, axially withdrawing the tube while supported on the mandrel through a bath of cooling liquid such that the external surface of the tube contacts in sequence (a) a quiescent zone, of surface area A, of cooling liquid exhibiting laminar flow, (b) a zone, of restricted cross-sectional area B, of cooling liquid exhibiting transitional flow, and (c) a zone, of cross-sectional area C, of cooling liquid exhibiting substantially spiral turbulent flow around the surface of the tube, the flow of cooling liquid in each of said zones being substantially countercurrent to the direction of movement of the tube, and the surface areas of said zones being such that $A > B < C$, and thereafter converting the cooled tube to tubular film by known film-forming techniques.

By "transitional" flow is meant that the flow of cooling liquid during its passage through restricted zone (b) gradually changes from the spiral flow entering from zone (c) to a substantially laminar flow before discharge of the cooling liquid into quiescent zone (a).

Unless otherwise stated, reference throughout this specification to axial movement refers to movement along, or in a direction substantially parallel to, the longitudinal axis of the extruded tube.

Although various forms of cooling bath may be employed in performing the method of the invention, the latter is, for convenience and without express or implied limitation of the scope of the invention, hereinafter described in terms of a collapsible bath having an axially compressible jacket, a liquid-retaining seal assembly, associated inlet and outlet means for cooling liquid, and supporting means for the jacket, a bath of this kind being the subject of our copending British patent application of even date.

The axially compressible jacket is suitably in the form of a hollow, generally cylindrical, tube having an inlet end for receiving an extruded tubular form, and an outlet end provided with an annular seal assembly to permit passage of the form therethrough while retaining between the jacket and tubular form a sufficient volume of cooling liquid to quench the tubular form to a desired temperature.

The jacket may be in any form which permits axial compression of all or part of its length, and suitably comprises a tubular telescopic assembly. However, the axial compression which can be achieved by an assembly of this kind is inherently restricted by the length of the individual segments of the telescopic assembly, and we therefore prefer to employ a jacket in the form of collapsible bellows so formed from a suitably pleated or folded membrane as to permit compression to a minimal axial dimension. A preferred jacket therefore comprises generally tubular bellows with a symmetrically pleated or corrugated membrane wall structure.

The jacket is fabricated from any material possessing adequate strength, flexibility and liquid impermeability to permit repeated axial compression and extension of the jacket without detriment to the liquid-retaining characteristics thereof, and conveniently comprises a rubberised fabric. The jacket may, if desired, be provided with reinforcing means — for example, a wire brace girding the jacket membrane in one or more of the reduced cross-sectional regions of the bellows.

To ensure that uniform cooling of the extruded tubular form is achieved, the flow of cooling liquid within the jacket should be substantially uniform around all regions of the form surface, and adjusting means are preferably provided for laterally displacing or centring the jacket relative to the axis of the moving tubular form to a position in which acceptable cooling behaviour is observed, and for retaining the jacket in that selected position.

In addition to being collapsible to minimal axial dimensions to facilitate removal or replacement thereof, a bath of the kind described is also advantageous in that the depth of the bath can be varied during production of a tubular film. Thus, simple axial extension of the jacket permits an increased depth of cooling liquid to be accommodated within the bath if an increase in the rate of cooling of the tubular form is desired. An immediate alteration in cooling rate is thereby achieved in a manner not readily possible with the relatively rigid and inextensible cooling baths hitherto employed.

Although a terminal seal assembly at the downstream end of the jacket in the form of a single resilient annular sealing member engageable with the external surface of the tubular form provides an adequate support for the cooling liquid in the bath in certain circumstances, we prefer to employ at least a pair of axially spaced apart annular sealing members to reduce the amount of cooling liquid retained on the external surface of the tubular form emerging from the seal assembly. To ensure that the upstream sealing member, i.e. that which first contacts the tubular form, effectively engages and creates a liquid-retaining seal with the surface of the tubular form, a superatmospheric pressure is desirably maintained on the underside of the upstream sealing member, and if a pair of axially spaced apart sealing members are employed this superatmospheric pressure is conveniently maintained by introducing a pressurised gas, such as air, into the gap between the spaced apart members.

Oriented film produced from a quenched tubular form retaining traces of moisture or cooling liquid on the surface thereof exhibits serious surface blemishes, and desirably therefore a liquid extractor, such as an annular sponge engageable with the external surface of the tubular form is provided downstream of the annular sealing member(s) to remove residual traces of liquid. Assistance of this objective may be achieved may be achieved by application of suction to the sponge.

Each annular sealing member may comprise a single annular disc of resilient material, such as natural rubber, but to ensure extended life and reliability of the seal assembly, we prefer that at least the upstream sealing member comprises a pair of contiguous annular discs, the upstream disc being of an abrasion resistant resilient material, such as silicone rubber, and the disc in contact with the underside thereof being of a material such as natural rubber. Other materials from which sealing discs may be formed include synthetic polymers, such as polytetrafluoroethylene.

To ensure effective sealing, the internal diameter of each sealing member is suitably fractionally less than the external diameter of the tubular form. Desirably therefore the seal assembly is so positioned that the or each sealing member bears against a region of the tubular form provided with an internal support to prevent collapse of the tubular form. Conveniently, the bath sealing members are positioned to cooperate with an internal mandrel located within the tubular form, or with a similar internal sealing assembly located within the tubular form at the downstream end of a lubricated quenching mandrel.

For convenience of operation the sealing members, and, if desired, the liquid extractor, are suitably incorporated in a cartridge or element which can be releasably mounted at the base of the compressible jacket. Thus, a cartridge seal assembly may be located in a simple flanged container and sealed thereto - for example, by one or more O-ring seals around the cartridge periphery, the container being secured, by bolts, clips or the like, to the downstream end of the axially compressible jacket.

A cartridge assembly of the king referred to is conveniently fabricated from a synthetic polymeric material, an oxymethylene polymer or copolymer being particularly suitable for this purpose. Other materials which may be employed include metals, such as aluminum or stainless steel, and thermosetting resinous materials - such as a Tufnol laminate.

An inlet for the supply of cooling liquid, such as water, is provided at any convenient position on the bath at or near the downstream end of the jacket so that the coolant flows through the bath in a generally countercurrent direction relative to the axial direction of movement of the tubular form.

The inlet to the bath is directed tangentially relative to the tubular form, thereby creating a swirling, spiral, countercurrent flow of coolant around the periphery of the tubular form. The improved heat-transfer between coolant and tubular form achieved by means of the spirally flowing coolant stream increases the cooling efficiency, and therefore decreases the volume of coolant required for a specified degree of cooling, compared to that in which a simple laminar or barely turbulent (Reynolds No. ~2000–3000) countercurrent coolant flow is adopted. By using a spinning, cyclone type coolant flow, particularly in combination with a bath providing a relatively large radial gap between the tubular form and surrounding jacket, it is possible to maintain a high velocity, despite the relatively low volume, of coolant flow. Thus, although the axial throughput of coolant in the turbulent zone may be relatively low - for example within a range of from 200 to 1000 gallons per hour (gph), the spiral flow rate of coolant adjacent the surface of the tubular form may, because of recirculation around the form, be considerably greater — for example, of the order of 100,000 gph. Maintenance of a high velocity spiral flow is further assisted by the large gap between the form and jacket which reduces frictional drag on the coolant.

For the production of high quality tubular film free from surface blemishes, the tubular form, before encountering the spiral countercurrent flow of coolant, should first encounter a relatively calm, non-turbulent, pond of coolant liquid. A throttle assembly to restrict the spiral flow of the coolant liquid, thereby creating a quiescent pool of liquid, is therefore provided at the upstream end of the jacket. Suitably the throttle assembly comprises an annular baffle or breaker plate dimensioned to provide a relatively narrow annular gap between the plate and tubular form, the cross-sectional area of the gap, B, being less than that, A, of the calm pond upstream of the throttle, and also less than that, C, of the spirally flowing pool downstream of the throttle. A simple plate of this kind serves to eliminate the spiral flow component of the countercurrent coolant stream, thereby enabling a quiescent pool of liquid to accumulate above the plate, prior to discharge of the liquid over a simple weir or other appropriate device. If desired, additional means, for example, at least one radially directed fin secured to the annular baffle plate, may be provided substantially to eliminate the spiral component of countercurrent coolant flow, thereby ensuring a conversion to substantially complete laminar flow of the cooling liquid in the quiescent pool.

Coolant liquid is therefore discharged from the quiescent pool, but to ensure the maintenance of non-turbulent flow in the quiescent zone, it is preferred that a major portion of the coolant flow is discharged from the upstream end of the compressible jacket below the breaker plate, thereby minimising the coolant momentum transfer across the breaker plate. By controlling the amount of cooling liquid discharged from below the breaker plate in this way, the vertical component of the velocity of liquid flowing through the narrow throttle gap can be controlled at an appropriately high value to ensure that the extruded tube does not, despite the narrowness of the gap, abrade against the internal edge of the breaker plate. Provision may also be made to introduce coolant liquid directly into the quiescent zone to vary the cooling characteristics of the bath system.

In addition to the cross-sectional area relationship of the quiescent, throttle and spiral flow zones, hereinbefore specified as: $A > B < C$, we prefer that the quiescent zone should be of sufficient length in the axial direction to ensure that the outer surface of the tube is cooled to a stable, coherent state under conditions of non-turbulent flow prior to entry of the tube into the spiral flow zone which, in turn, should be sufficiently long to cool the outer surface of the tube to a state not susceptible to damage by contact with the sealing assembly and subsequent tube withdrawal means. Preferably, therefore, the axial dimensions of the quiescent (a), throttle (b), and spiral flow (c) zones, satisfy the relationship: $c > a > b$.

The form of supporting means to releasably secure the compressible jacket in an axially extended mode depends, inter alia, on the structure of the jacket. A suitable system for a jacket in the form of tubular bellows comprises a plurality of axial support members, symmetrically spaced around the jacket, an axially slideable boss or sleeve, attached to the upstream end of the jacket, being associated with each support member and lockable thereto in the desired axial position.

As hereinbefore described, a bath system of the kind described is employed in combination with an internal mandrel quenching system. A typical lubricated mandrel system suitable in accordance with the method of the invention for the production of polyolefine films is described in British Pat. No. 1,284,312 which relates to the cooling of an extruded tube by passing an extruded tube over an internal cooling mandrel, continuously supplying a sheath of heat-transfer liquid to between the mandrel and the tube, maintaining, at the end of the mandrel remote from the extruder, a head of liquid capable of exerting pressure on the sheath of liquid, and withdrawing the liquid from the head, wherein the pressure of the liquid between the mandrel and the tube at any one point is greater than the pressure on the outside of the tube at that point. The sheath of heat-transfer liquid is conveniently supplied by overflow from a circumferential channel at the upstream end of the mandrel, i.e. adjacent the extrusion die.

To ensure that the extruded tube is properly dimensioned to assist the formation therefrom of uniformly profiled film, we prefer that the internal surface of the tube should engage the mandrel, through the associated sheath of heat-transfer liquid, at a point upstream from that at which the external surface of the tube first encounters the quiescent pool of liquid in the cooling bath.

The system of the present invention may be employed in the production of tubular films from thermoplastics polymeric materials, and particularly in the production of self-supporting films of crystalline or crystallisable polymers. For example, polymers and copolymers of 1-olefines, such as high density polyethylene, polypropylene or ethylene propylene copolymers, of polybutene-1, of poly-4-methyl pentene-1, of polyesters such as polyethylene terephthalate and polyethylene-1,2-di-phenoxyethane-4,4'-dicarboxylate, of polysulphones, and of the various nylons, may be processed. A suitable film-forming material is a high molecular weight stereoregular predominantly crystalline polymer of propylene, either in the form of a homopolymer or copolymerised with minor quantities (e.g. up to 15% by weight of the copolymer) of other unsaturated monomers, such as ethylene. Coated films and coextruded multiple-layer films may also be processed.

By a "self-supporting" film is meant a film capable of independent existence in the absence of a supporting substrate.

An oriented tubular film is suitably produced by melt extruding the desired polymeric material in tubular form from a simple annular die, cooling the extruded tube in accordance with the present invention, reheating and inflating the tube by the so-called "bubble" process to introduce transverse orientation, and simultaneously elongating the tube longitudinally to orient the film in a lengthwise direction. The film is then preferably "heat-set", i.e. dimensional stability of the film is improved by heating the film, while restrained against thermal shrinkage, to a temperature above the glass transition temperature of the polymer from which the film is formed but below the melting point thereof.

A similar technique employing a multi-channel, annular, coextrusion die is suitable for the production of multiple-layer films, such as a polypropylene substrate having on at least one surface thereof a layer of a copolymer of propylene (80 to 95% by weight) with another alphaolefine containing from 4 to 10 carbon atoms, such as butene-1.

Films made according to the present invention may conveniently contain any of the additives conventionally empolyed in the manufacture of thermoplastics films, may be subjected to conventional after-treatments - for example, exposure to a corona discharge treatment to improve the bonding and print-receptive characteristics of the film surface, and may vary in thickness depending on the intended application. Films having a thickness of from 2 to 150 microns are of general utility, while those intended for use in packaging operations are suitably within a thickness range from 10 to 50 microns.

Figure 2:
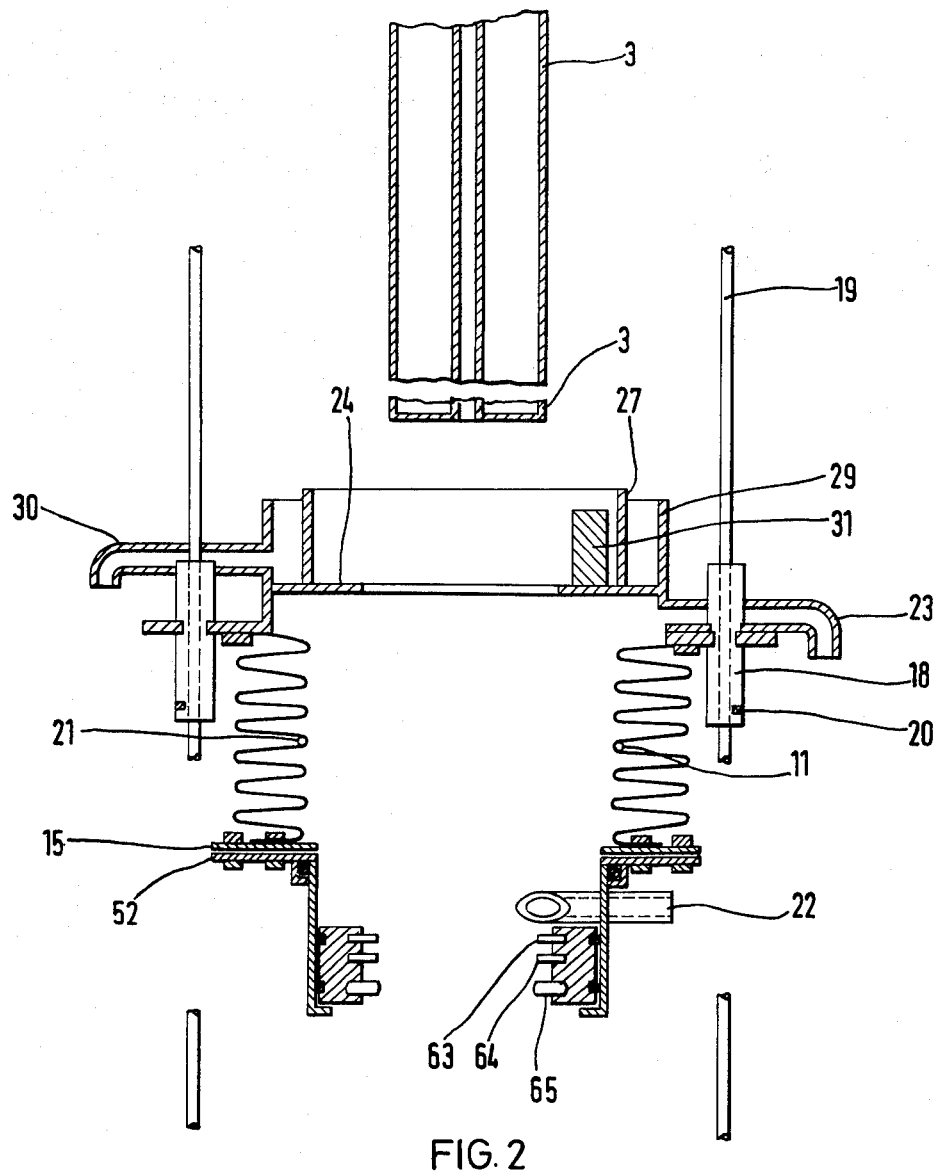
Figure 3:
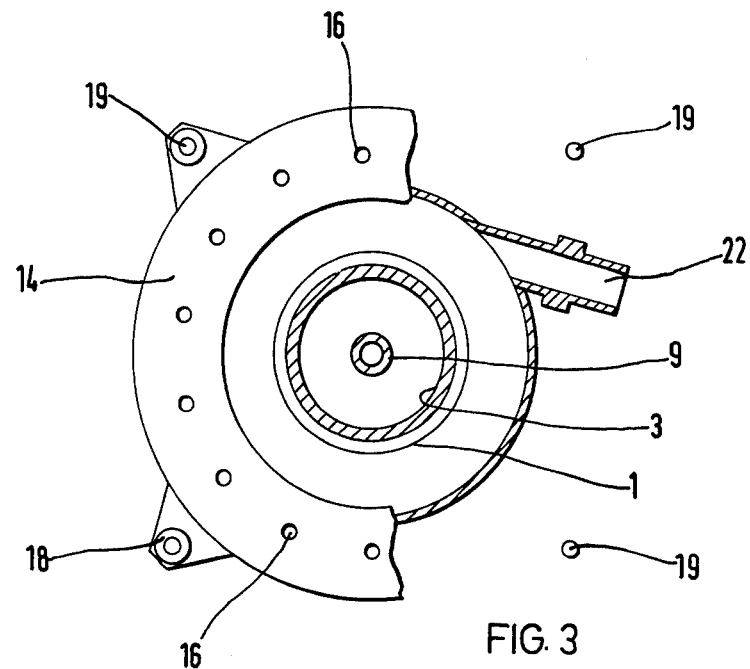
Figure 4:
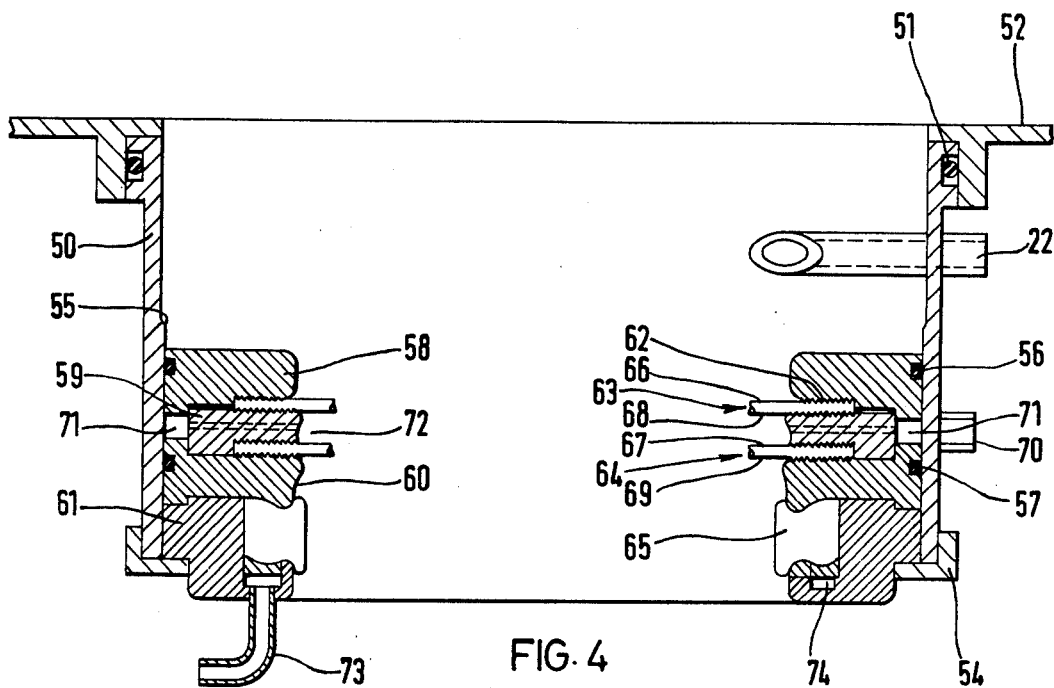

The invention is illustrated by reference to the accompanying drawings in which:

FIG. 1 is a schematic sectional elevation of an axially compressible quench bath in an extended configuration for cooling a tubular extrudate, FIG. 2 is a similar view of the bath in an axially compressed configuration, FIG. 3 is a schematic sectional plan view along the line III—III of FIG. 1, and FIG. 4 is a detailed schematic sectional elevation, to a different scale, of a cartridge seal assembly.

Referring to FIG. 1 of the drawings, a tube of thermoplastics polymeric material 1 is extruded from an annular extrusion die 2, and withdrawn therefrom in a substantially vertical downward direction, on to a slightly tapered internal cooling mandrel 3 by a pair of contra-rotating nip rolls (not shown), which then forward the cooled tube for further treatment. An aqueous coolant is supplied to an annular channel 4 at the upstream end of the mandrel whence it is allowed to flow down as an annular sheath in the space 5 between the mandrel 3 and the tube 1. Coolant accumulating above a resilient annular sealing member 6, is removed in a controlled manner through the interior of the mandrel by conventional withdrawal means (not shown).

An effective seal between the tube 1 and mandrel 3 is provided by a second resilient annular sealing member 7, and final traces of coolant are removed from the internal surface of the tube by contact with an annular sponge 8. Coolant absorbed by the sponge is removed therefrom by the application of suction from a pipe (not shown) passing through the interior of the mandrel.

An internal conduit 9 through the centre of the mandrel is provided for the introduction of gas, e.g. air, under pressure to inflate the cooled and reheated tube in conventional manner for the production of oriented tubular film.

As well as being cooled internally by the mandrel, the tube 1 is cooled externally by passage through a water bath, designated generally by reference 10, which surrounds the tube. The bath comprises an axially compressible jacket in the form of symmetrically pleated bellows 11 of a resilient and waterproof material, such as a rubberised fabric. The upstream end of the bath is open to provide an inlet orifice 12 through which the tube may be introduced, and a cartridge sealing assembly 13 at the downstream end of the bath provides a liquid-tight exit orifice through which the cooled tube may pass for conversion to tubular form.

Each end of the bellows is secured respectively to an annular flange plate, 14, 15, by a ring of studs or rivets 16, 17, the upstream flange plate 14 being supportable in the axially extended configuration of FIG. 1 by four bosses 18 respectively axially slideable on each of four symmetrically disposed runners 19, and releasably securable thereto by grub screws 20.

To prevent excessive outward distortion of the bellows under the pressure of liquid (water) within the bath in the extended mode, a circular wire brace 21 is incorporated in at least one of the reduced cross-sectional regions of the bellows.

An inlet conduit 22 for cooling liquid is located near the downstream end of the bath, the inlet being disposed tangentially relative to the jacket assembly (FIG. 3), thereby ensuring that the cooling liquid flows upwardly in a spiral countercurrent flow relative to the axial direction of movement of tube 1, an outlet conduit 23, closeable by a valve (not shown), being provided near the upstream end of the jacket to control discharge of a portion of the cooling liquid from the bath, if desired.

An annular breaker plate 24 positioned upstream of discharge outlet 23, provides a restricted throttle gap 25 through which cooling liquid flows in an upstream direction relative to tube 1, the breaker plate substantially eliminating the spiral component of liquid flow to create a relatively calm pond of liquid within a chamber 26 bounded by tube 1, plate 24 and upstanding annular wall 27. Cooling liquid from the calm pond overflows the top of wall 27 into a discharge chamber 28 bounded by a further annular wall 29, and is discharged in controlled fashion from a second discharge conduit 30.

At least one radially disposed fin plate 31 upstanding from breaker plate 24 assists the maintenance of a calm, non-turbulent pool of cooling liquid in chamber 26.

Alteration of the depth of cooling liquid in contact with the tubular extrudate requires only a simple axial adjustment of the slideable bosses 18 on runners 19, and removal of the bath from around the mandrel is readily accomplished by compression of the bellows assembly to the position illustrated in FIG. 2, after discharge of the cooling liquid from the bath, the bath assembly together with its supporting runners 19 being mounted on a pivotal support bracket (not shown) for displacement relative to the mandrel axis.

The cartridge sealing assembly at the downstream end of the compressible jacket is conveniently described by reference to FIG. 4 and comprises a cylindrical case 50 coupled through a resilient O-ring seal 51 to an annular flange plate 52 which can be secured to bellows flange plate 15 by a ring of bolts 53 (FIG. 1). An angled flange 54 at the downstream end of case 50 retains a cartridge element 13 which can be introduced into the upstream end of case 50 and urged downwardly beyond land 55 to be retained in sealing engagement with the internal wall of the case by means of resilient O-ring seals 56, 57.

The cartridge element comprises a plurality of annular interlocking components 58, 59, 60, 61, securable to each other by axially penetrating bolts, studs, or the like, (not shown) to form a composite element providing annular recesses with cooperating toothed surfaces, e.g. surface 62, between which are retained annular sealing members 63, 64, and annular sponge 65. Each sealing member comprises an annular silicone rubber disc 66, 67, for engagement with the external surface of the tube (FIG. 1), supported on the underside by a natural rubber disc 68, 69. Inlet conduit 70 to annular channel 71 permits the introduction of gas under pressure to the space 72 between sealing members 63 and 64 to create a zone of superatmospheric pressure to support the upstream sealing member 63 in close sealing engagement with the tube surface (FIG. 1).

Exhaust conduit 73 coupled through annular channel 74 to sponge 65 permits the application of suction to remove moisture accumulated by sponge 65 from the external surface of tube 1.

I claim:

1. A method of producing a polymeric tubular film comprising
   extruding a tube of a film-forming polymeric material,
   passing the extruded tube over and around an internal cooling mandrel,
   axially withdrawing the tube while supported on the mandrel through a bath of cooling liquid such that the external surface of the tube contacts in sequence
   (a) a quiescent zone, of surface area A, of cooling liquid exhibiting laminar flow,
   (b) a zone, of restricted cross-sectional area B, of cooling liquid exhibiting transitional flow, and
   (c) a zone, of cross-sectional area C, of cooling liquid exhibiting substantially spiral turbulent flow around the surface of the tube,
   the flow of cooling liquid in each of said zones being substantially countercurrent to the direction of movement of the tube, and
   the surface areas of said zones being such that $A > B < C$, and
   thereafter converting the cooled tube to tubular film.

2. A method according to claim 1 wherein the Reynolds Number of the cooling liquid flowing in zone (c) exceeds 3000.

3. A method according to claim 1 wherein a major portion of the cooling liquid flowing in zone (c) is discharged therefrom downstream, in the direction of movement of the extruded tube, of restricted zone (b).

4. A method according to claim 1 wherein additional cooling liquid is introduced directly into quiescent zone (a).

5. A method according to claim 1 wherein the axial dimensions of the quiescent (a), restricted (b), and spiral flow (c) zones are such that c>a>b.

6. A method according to claim 1 wherein a sheath of heat-transfer liquid is maintained between the mandrel and tube.

7. A method according to claim 1 wherein the polymeric material is a stereoregular predominantly crystalline homo- or co-polymer propylene.

8. A method according to claim 1 wherein the tube is a coextruded multiple-layer tube.

9. A method according to claim 8 wherein the tube comprises a polypropylene substrate and a surface layer of a copolymer containing from 80 to 95 wt % of propylene and from 5 to 20 wt % of an alpha-olefin having from 4 to 10 carbon atoms in its molecule.

* * * * *